(12) United States Patent
Birkett et al.

(10) Patent No.: US 11,080,105 B1
(45) Date of Patent: Aug. 3, 2021

(54) SYSTEMS, METHODS, AND APPARATUSES FOR ROUTING API CALLS

(71) Applicant: CDK GLOBAL, LLC, Hoffman Estates, IL (US)

(72) Inventors: Julian Sydney Birkett, Thatcham (GB); Gregory Lionel Birkett, Thatcham (GB); Daniel Timothy New, Portland, OR (US); Sahaswaranamam Subramanian, Foxriver Grove, IL (US)

(73) Assignee: CDK GLOBAL, LLC, Hoffman Estates, IL (US)

( * ) Notice: Subject to any disclaimer, the term of this patent is extended or adjusted under 35 U.S.C. 154(b) by 0 days.

(21) Appl. No.: 16/951,833

(22) Filed: Nov. 18, 2020

(51) Int. Cl.
*G06F 3/00* (2006.01)
*G06F 9/54* (2006.01)

(52) U.S. Cl.
CPC .................................. *G06F 9/541* (2013.01)

(58) Field of Classification Search
CPC ....................................................... G06F 9/542
USPC ......................................................... 719/328
See application file for complete search history.

(56) References Cited

U.S. PATENT DOCUMENTS

| | | | |
|---|---|---|---|
| 3,792,445 A | 2/1974 | Bucks et al. | |
| 4,258,421 A | 3/1981 | Juhasz et al. | |
| 4,992,940 A | 2/1991 | Dworkin | |
| 5,003,476 A | 3/1991 | Abe | |
| 5,034,889 A | 7/1991 | Abe | |
| 5,058,044 A | 10/1991 | Stewart et al. | |
| 5,421,015 A | 5/1995 | Khoyi et al. | |
| 5,442,553 A | 8/1995 | Parrillo | |
| 5,452,446 A | 9/1995 | Johnson | |
| 5,521,815 A | 5/1996 | Rose, Jr. | |
| 5,649,186 A | 7/1997 | Ferguson | |
| 5,694,595 A | 12/1997 | Jacobs et al. | |
| 5,729,452 A | 3/1998 | Smith et al. | |
| 5,787,177 A | 7/1998 | Leppek | |
| 5,790,785 A | 8/1998 | Klug et al. | |
| 5,835,712 A | 11/1998 | Dufresne | |
| 5,845,299 A | 12/1998 | Arora et al. | |
| 5,862,346 A | 1/1999 | Kley et al. | |
| 5,911,145 A | 6/1999 | Arora et al. | |
| 5,956,720 A | 9/1999 | Fernandez et al. | |
| 5,974,149 A | 10/1999 | Leppek | |

(Continued)

FOREIGN PATENT DOCUMENTS

| | | |
|---|---|---|
| CA | 2494350 | 5/2004 |
| EP | 0461888 | 3/1995 |

OTHER PUBLICATIONS

Clemens Grelck, A Multithreaded Compiler Backend for High-Level Array Programming. (Year: 2003).*

(Continued)

*Primary Examiner* — Lechi Truong
(74) *Attorney, Agent, or Firm* — Stoel Rives LLP (57) ABSTRACT

The present disclosure relates to methods, systems and apparatuses for routing API calls to multiple backend systems that share a common API. A system may receive an API call comprising a unique identifier from a client computing device. The system may identify the unique identifier in the API call, and determine a target backend system associated with the unique identifier from the plurality of backend systems. Further, the system may route the API call to the target backend system based on the unique identifier.

14 Claims, 5 Drawing Sheets

(56) References Cited

U.S. PATENT DOCUMENTS

| | | |
|---|---|---|
| 5,974,418 A | 10/1999 | Blinn et al. |
| 5,974,428 A | 10/1999 | Gerard et al. |
| 5,978,776 A | 11/1999 | Seretti et al. |
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | Lemole et al. |
| 6,018,748 A | 1/2000 | Smith |
| 6,021,416 A | 2/2000 | Dauerer et al. |
| 6,021,426 A | 2/2000 | Douglis et al. |
| 6,026,433 A | 2/2000 | D'Arlach et al. |
| 6,041,310 A | 3/2000 | Green et al. |
| 6,041,344 A | 3/2000 | Bodamer et al. |
| 6,055,541 A | 4/2000 | Solecki et al. |
| 6,061,698 A | 5/2000 | Chadha et al. |
| 6,067,559 A | 5/2000 | Allard et al. |
| 6,070,164 A | 5/2000 | Vagnozzi |
| 6,134,532 A | 10/2000 | Lazarus et al. |
| 6,151,609 A | 11/2000 | Truong |
| 6,178,432 B1 | 1/2001 | Cook et al. |
| 6,181,994 B1 | 1/2001 | Colson et al. |
| 6,185,614 B1 | 2/2001 | Cuomo et al. |
| 6,189,104 B1 | 2/2001 | Leppek |
| 6,216,129 B1 | 4/2001 | Eldering |
| 6,219,667 B1 | 4/2001 | Lu et al. |
| 6,236,994 B1 | 5/2001 | Schwartz et al. |
| 6,240,365 B1 | 5/2001 | Bunn |
| 6,263,268 B1 | 7/2001 | Nathanson |
| 6,285,932 B1 | 9/2001 | De Belledeuille et al. |
| 6,289,382 B1 | 9/2001 | Bowman-Amuah |
| 6,295,061 B1 | 9/2001 | Park et al. |
| 6,330,499 B1 | 12/2001 | Chou et al. |
| 6,343,302 B1 | 1/2002 | Graham |
| 6,353,824 B1 | 3/2002 | Boguraev et al. |
| 6,356,822 B1 | 3/2002 | Diaz et al. |
| 6,374,241 B1 | 4/2002 | Lamburt et al. |
| 6,397,226 B1 | 5/2002 | Sage |
| 6,397,336 B2 | 5/2002 | Leppek |
| 6,401,103 B1 | 6/2002 | Ho et al. |
| 6,421,733 B1 | 7/2002 | Tso et al. |
| 6,473,849 B1 | 10/2002 | Keller et al. |
| 6,496,855 B1 | 12/2002 | Hunt et al. |
| 6,505,106 B1 | 1/2003 | Lawrence et al. |
| 6,505,205 B1 | 1/2003 | Kothuri et al. |
| 6,519,617 B1 | 2/2003 | Wanderski et al. |
| 6,535,879 B1 | 3/2003 | Behera |
| 6,539,370 B1 | 3/2003 | Chang et al. |
| 6,546,216 B2 | 4/2003 | Mizoguchi et al. |
| 6,553,373 B2 | 4/2003 | Boguraev et al. |
| 6,556,904 B1 | 4/2003 | Larson et al. |
| 6,564,216 B2 | 5/2003 | Waters |
| 6,571,253 B1 | 5/2003 | Thompson et al. |
| 6,581,061 B2 | 6/2003 | Graham |
| 6,583,794 B1 | 6/2003 | Wattenberg |
| 6,594,664 B1 | 7/2003 | Estrada et al. |
| 6,606,525 B1 | 8/2003 | Muthuswamy et al. |
| 6,629,148 B1 | 9/2003 | Ahmed et al. |
| 6,643,663 B1 | 11/2003 | Dabney et al. |
| 6,654,726 B1 | 11/2003 | Hanzek |
| 6,678,706 B1 | 1/2004 | Fishel |
| 6,697,825 B1 | 2/2004 | Underwood et al. |
| 6,701,232 B2 | 3/2004 | Yamaki |
| 6,721,747 B2 | 4/2004 | Lipkin |
| 6,728,685 B1 | 4/2004 | Ahluwalia |
| 6,738,750 B2 | 5/2004 | Stone et al. |
| 6,744,735 B1 | 6/2004 | Nakaguro |
| 6,748,305 B1 | 6/2004 | Klausner et al. |
| 6,785,864 B1 | 8/2004 | Te et al. |
| 6,795,819 B2 | 9/2004 | Wheeler et al. |
| 6,823,258 B2 | 11/2004 | Ukai et al. |
| 6,823,359 B1 | 11/2004 | Heidingsfeld |
| 6,826,594 B1 | 11/2004 | Pettersen |
| 6,847,988 B2 | 1/2005 | Toyouchi et al. |
| 6,850,823 B2 | 2/2005 | Eun et al. |
| 6,871,216 B2 | 3/2005 | Miller et al. |
| 6,901,430 B1 | 3/2005 | Smith |
| 6,894,601 B1 | 5/2005 | Grunden et al. |
| 6,917,941 B2 | 7/2005 | Wight et al. |
| 6,922,674 B1 | 7/2005 | Nelson |
| 6,941,203 B2 | 9/2005 | Chen |
| 6,944,677 B1 | 9/2005 | Zhao |
| 6,954,731 B1 | 10/2005 | Montague et al. |
| 6,963,854 B1 | 11/2005 | Boyd et al. |
| 6,965,806 B2 | 11/2005 | Eryurek et al. |
| 6,965,968 B1 | 11/2005 | Touboul |
| 6,978,273 B1 | 12/2005 | Bonneau et al. |
| 6,981,028 B1 | 12/2005 | Rawat et al. |
| 6,990,629 B1 | 1/2006 | Heaney et al. |
| 6,993,421 B2 | 1/2006 | Pillar |
| 7,000,184 B2 | 2/2006 | Matveyenko et al. |
| 7,003,476 B1 | 2/2006 | Samra et al. |
| 7,028,072 B1 | 4/2006 | Kliger et al. |
| 7,031,554 B2 | 4/2006 | Iwane |
| 7,039,704 B2 | 5/2006 | Davis et al. |
| 7,047,318 B1 | 5/2006 | Svedloff |
| 7,062,343 B2 | 6/2006 | Ogushi et al. |
| 7,062,506 B2 | 6/2006 | Taylor et al. |
| 7,072,943 B2 | 7/2006 | Landesmann |
| 7,092,803 B2 | 8/2006 | Kapolka et al. |
| 7,107,268 B1 | 9/2006 | Zawadzki et al. |
| 7,124,116 B2 | 10/2006 | Huyler |
| 7,152,207 B1 | 12/2006 | Underwood et al. |
| 7,155,491 B1 | 12/2006 | Schultz et al. |
| 7,171,418 B2 | 1/2007 | Blessin |
| 7,184,866 B2 | 2/2007 | Squires et al. |
| 7,197,764 B2 | 3/2007 | Cichowlas |
| 7,219,234 B1 | 5/2007 | Ashland et al. |
| 7,240,125 B2 | 7/2007 | Fleming |
| 7,246,263 B2 | 7/2007 | Skingle |
| 7,281,029 B2 | 10/2007 | Rawat |
| 7,287,000 B2 | 10/2007 | Boyd et al. |
| 7,322,007 B2 | 1/2008 | Schowtka et al. |
| 7,386,786 B2 | 6/2008 | Davis et al. |
| 7,401,289 B2 | 7/2008 | Lachhwani et al. |
| 7,406,429 B2 | 7/2008 | Salonen |
| 7,433,891 B2 | 10/2008 | Haber et al. |
| 7,457,693 B2 | 11/2008 | Olsen et al. |
| 7,477,968 B1 | 1/2009 | Lowrey |
| 7,480,551 B1 | 1/2009 | Lowrey et al. |
| 7,496,543 B1 | 2/2009 | Bamford et al. |
| 7,502,672 B1 | 3/2009 | Kolls |
| 7,536,641 B2 | 5/2009 | Rosenstein et al. |
| 7,548,985 B2 | 6/2009 | Guigui |
| 7,587,504 B2 | 9/2009 | Adams et al. |
| 7,590,476 B2 | 9/2009 | Shumate |
| 7,593,925 B2 | 9/2009 | Cadiz et al. |
| 7,593,999 B2 | 9/2009 | Nathanson |
| 7,613,627 B2 | 11/2009 | Doyle et al. |
| 7,620,484 B1 | 11/2009 | Chen |
| 7,624,342 B2 | 11/2009 | Matveyenko et al. |
| 7,657,594 B2 | 2/2010 | Banga et al. |
| 7,664,667 B1 | 2/2010 | Ruppelt et al. |
| 7,739,007 B2 | 6/2010 | Logsdon |
| 7,747,680 B2 | 6/2010 | Ravikumar et al. |
| 7,778,841 B1 | 8/2010 | Bayer et al. |
| 7,801,945 B1 | 9/2010 | Geddes et al. |
| 7,818,380 B2 | 10/2010 | Tamura et al. |
| 7,861,309 B2 | 12/2010 | Spearman et al. |
| 7,865,409 B1 | 1/2011 | Monaghan |
| 7,870,253 B2 | 1/2011 | Muilenburg et al. |
| 7,899,701 B1 | 3/2011 | Odom |
| 7,908,051 B2 | 3/2011 | Oesterling |
| 7,979,506 B2 | 7/2011 | Cole |
| 8,010,423 B2 | 8/2011 | Bodin et al. |
| 8,019,501 B2 | 9/2011 | Breed |
| 8,036,788 B2 | 10/2011 | Breed |
| 8,051,159 B2 | 11/2011 | Muilenburg et al. |
| 8,055,544 B2 | 11/2011 | Ullman et al. |
| 8,060,274 B2 | 11/2011 | Boss et al. |
| 8,095,403 B2 | 1/2012 | Price |
| 8,099,308 B2 | 1/2012 | Uyeki |
| 8,135,804 B2 | 3/2012 | Uyeki |
| 8,145,379 B2 | 3/2012 | Schwinke |
| 8,190,322 B2 | 5/2012 | Lin et al. |

(56) References Cited

U.S. PATENT DOCUMENTS

| | | |
|---|---|---|
| 8,209,259 B2 | 6/2012 | Graham, Jr. et al. |
| 8,212,667 B2 | 7/2012 | Petite et al. |
| 8,271,473 B2 | 9/2012 | Berg |
| 8,271,547 B2 | 9/2012 | Taylor et al. |
| 8,275,717 B2 | 9/2012 | Ullman et al. |
| 8,285,439 B2 | 10/2012 | Hodges |
| 8,296,007 B2 | 10/2012 | Swaminathan et al. |
| 8,311,905 B1 | 11/2012 | Campbell et al. |
| 8,355,950 B2 | 1/2013 | Colson et al. |
| 8,407,664 B2 | 3/2013 | Moosmann et al. |
| 8,428,815 B2 | 4/2013 | Van Engelshoven et al. |
| 8,438,310 B2 | 5/2013 | Muilenburg et al. |
| 8,521,654 B2 | 8/2013 | Ford et al. |
| 8,538,894 B2 | 9/2013 | Ullman et al. |
| 8,645,193 B2 | 2/2014 | Swinson et al. |
| 8,676,638 B1 | 3/2014 | Blair et al. |
| 8,725,341 B2 | 5/2014 | Ogasawara |
| 8,745,641 B1 * | 6/2014 | Coker ............... G06F 11/3668 719/328 |
| 8,849,689 B1 | 9/2014 | Jagannathan et al. |
| 8,886,389 B2 | 11/2014 | Edwards et al. |
| 8,924,071 B2 | 12/2014 | Stanek et al. |
| 8,954,222 B2 | 2/2015 | Costantino |
| 8,996,230 B2 | 3/2015 | Lorenz et al. |
| 8,996,235 B2 | 3/2015 | Singh et al. |
| 9,014,908 B2 | 4/2015 | Chen et al. |
| 9,015,059 B2 | 4/2015 | Sims et al. |
| 9,026,304 B2 | 5/2015 | Olsen, III et al. |
| 9,047,722 B2 | 6/2015 | Kurnik et al. |
| 9,165,413 B2 | 10/2015 | Jones et al. |
| 9,183,681 B2 | 11/2015 | Fish |
| 9,325,650 B2 | 4/2016 | Yalavarty et al. |
| 9,349,223 B1 | 5/2016 | Palmer |
| 9,384,597 B2 | 7/2016 | Koch et al. |
| 9,577,866 B2 | 2/2017 | Rogers et al. |
| 9,596,287 B2 | 3/2017 | Rybak et al. |
| 9,619,945 B2 | 4/2017 | Adderly et al. |
| 9,659,495 B2 | 5/2017 | Modica et al. |
| 9,706,008 B2 | 7/2017 | Rajan et al. |
| 9,715,665 B2 | 7/2017 | Schondorf et al. |
| 9,754,304 B2 | 9/2017 | Taira et al. |
| 9,778,045 B2 | 10/2017 | Bang |
| 9,836,714 B2 | 12/2017 | Lander et al. |
| 10,032,139 B2 | 7/2018 | Adderly et al. |
| 10,083,411 B2 | 9/2018 | Kinsey et al. |
| 10,229,394 B1 | 3/2019 | Davis et al. |
| 10,475,256 B2 | 11/2019 | Chowdhury et al. |
| 2001/0005831 A1 | 6/2001 | Lewin et al. |
| 2001/0014868 A1 | 8/2001 | Herz et al. |
| 2001/0037332 A1 | 11/2001 | Miller et al. |
| 2001/0039594 A1 | 11/2001 | Park et al. |
| 2001/0054049 A1 | 12/2001 | Maeda et al. |
| 2002/0023111 A1 | 2/2002 | Arora et al. |
| 2002/0024537 A1 | 2/2002 | Jones et al. |
| 2002/0026359 A1 | 2/2002 | Long et al. |
| 2002/0032626 A1 | 3/2002 | Dewolf et al. |
| 2002/0032701 A1 | 3/2002 | Gao et al. |
| 2002/0042738 A1 | 4/2002 | Srinivasan et al. |
| 2002/0046245 A1 | 4/2002 | Hillar et al. |
| 2002/0049831 A1 | 4/2002 | Platner et al. |
| 2002/0052778 A1 | 5/2002 | Murphy et al. |
| 2002/0059260 A1 | 5/2002 | Jas |
| 2002/0065698 A1 | 5/2002 | Schick et al. |
| 2002/0065739 A1 | 5/2002 | Florance et al. |
| 2002/0069110 A1 | 6/2002 | Sonnenberg |
| 2002/0073080 A1 | 6/2002 | Lipkin |
| 2002/0082978 A1 | 6/2002 | Ghouri et al. |
| 2002/0091755 A1 | 7/2002 | Narin |
| 2002/0107739 A1 | 8/2002 | Schlee |
| 2002/0111727 A1 | 8/2002 | Vanstory et al. |
| 2002/0111844 A1 | 8/2002 | Vanstory et al. |
| 2002/0116418 A1 | 8/2002 | Lachwani et al. |
| 2002/0123359 A1 | 9/2002 | Wei et al. |
| 2002/0124053 A1 | 9/2002 | Adams et al. |
| 2002/0128728 A1 | 9/2002 | Murakami et al. |
| 2002/0129054 A1 | 9/2002 | Ferguson et al. |
| 2002/0133273 A1 | 9/2002 | Lowrey et al. |
| 2002/0138331 A1 | 9/2002 | Hosea et al. |
| 2002/0143646 A1 | 10/2002 | Boyden et al. |
| 2002/0154146 A1 | 10/2002 | Rodriquez et al. |
| 2002/0169851 A1 | 11/2002 | Weathersby et al. |
| 2002/0173885 A1 | 11/2002 | Lowrey et al. |
| 2002/0196273 A1 | 12/2002 | Krause |
| 2002/0198761 A1 | 12/2002 | Ryan et al. |
| 2002/0198878 A1 | 12/2002 | Baxter et al. |
| 2003/0014443 A1 | 1/2003 | Bernstein et al. |
| 2003/0023632 A1 | 1/2003 | Ries et al. |
| 2003/0033378 A1 | 2/2003 | Needham et al. |
| 2003/0036832 A1 | 2/2003 | Kokes et al. |
| 2003/0036964 A1 | 2/2003 | Boyden et al. |
| 2003/0037263 A1 | 2/2003 | Kamat et al. |
| 2003/0046179 A1 | 3/2003 | Anabtawi et al. |
| 2003/0051022 A1 | 3/2003 | Sogabe et al. |
| 2003/0055666 A1 | 3/2003 | Roddy et al. |
| 2003/0061263 A1 | 3/2003 | Riddle |
| 2003/0065532 A1 | 4/2003 | Takaoka |
| 2003/0065583 A1 | 4/2003 | Takaoka |
| 2003/0069785 A1 | 4/2003 | Lohse |
| 2003/0069790 A1 | 4/2003 | Kane |
| 2003/0074392 A1 | 4/2003 | Campbell et al. |
| 2003/0095038 A1 | 5/2003 | Dix |
| 2003/0101262 A1 | 5/2003 | Godwin |
| 2003/0115292 A1 | 6/2003 | Griffin et al. |
| 2003/0120502 A1 | 6/2003 | Robb et al. |
| 2003/0145310 A1 | 7/2003 | Thames et al. |
| 2003/0177050 A1 | 9/2003 | Crampton et al. |
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |
| 2004/0039646 A1 | 2/2004 | Hacker |
| 2004/0041818 A1 | 3/2004 | White et al. |
| 2004/0073546 A1 | 4/2004 | Forster et al. |
| 2004/0073564 A1 | 4/2004 | Haber et al. |
| 2004/0088228 A1 | 5/2004 | Mercer et al. |
| 2004/0093243 A1 | 5/2004 | Bodin et al. |
| 2004/0117046 A1 | 6/2004 | Colle et al. |
| 2004/0122735 A1 | 6/2004 | Meshkin et al. |
| 2004/0128320 A1 | 7/2004 | Grove et al. |
| 2004/0139203 A1 | 7/2004 | Graham, Jr. et al. |
| 2004/0148342 A1 | 7/2004 | Cotte |
| 2004/0156020 A1 | 8/2004 | Edwards |
| 2004/0163047 A1 | 8/2004 | Nagahara et al. |
| 2004/0181464 A1 | 9/2004 | Vanker et al. |
| 2004/0199413 A1 | 10/2004 | Hauser et al. |
| 2004/0220863 A1 | 11/2004 | Porter et al. |
| 2004/0225664 A1 | 11/2004 | Casement |
| 2004/0230897 A1 | 11/2004 | Latzel |
| 2004/0255233 A1 | 12/2004 | Croney et al. |
| 2004/0267263 A1 | 12/2004 | May |
| 2004/0268225 A1 | 12/2004 | Walsh et al. |
| 2004/0268232 A1 | 12/2004 | Tunning |
| 2005/0015491 A1 | 1/2005 | Koeppel |
| 2005/0021197 A1 | 1/2005 | Zimmerman et al. |
| 2005/0027611 A1 * | 2/2005 | Wharton ............ G06Q 30/0641 705/26.62 |
| 2005/0065804 A1 | 3/2005 | Worsham et al. |
| 2005/0096963 A1 | 5/2005 | Myr et al. |
| 2005/0108112 A1 | 5/2005 | Ellenson et al. |
| 2005/0114270 A1 | 5/2005 | Hind et al. |
| 2005/0114764 A1 | 5/2005 | Gudenkauf et al. |
| 2005/0108637 A1 | 6/2005 | Sahota et al. |
| 2005/0149398 A1 | 7/2005 | McKay |
| 2005/0171836 A1 | 8/2005 | Leacy |
| 2005/0176482 A1 | 8/2005 | Raisinghani et al. |
| 2005/0187834 A1 | 8/2005 | Painter et al. |
| 2005/0228736 A1 | 10/2005 | Norman et al. |
| 2005/0267774 A1 | 12/2005 | Merritt et al. |
| 2005/0268282 A1 | 12/2005 | Laird |
| 2005/0289020 A1 | 12/2005 | Bruns et al. |
| 2005/0289599 A1 | 12/2005 | Matsuura et al. |
| 2006/0031811 A1 | 2/2006 | Ernst et al. |
| 2006/0059253 A1 | 3/2006 | Goodman et al. |

(56) References Cited

U.S. PATENT DOCUMENTS

| | | |
|---|---|---|
| 2006/0064637 A1 | 3/2006 | Rechterman et al. |
| 2006/0123330 A1 | 6/2006 | Horiuchi et al. |
| 2006/0129423 A1 | 6/2006 | Sheinson et al. |
| 2006/0129982 A1 | 6/2006 | Doyle |
| 2006/0136105 A1 | 6/2006 | Larson |
| 2006/0161841 A1 | 7/2006 | Horiuchi et al. |
| 2006/0200751 A1 | 9/2006 | Underwood et al. |
| 2006/0248442 A1 | 11/2006 | Rosenstein et al. |
| 2006/0265355 A1 | 11/2006 | Taylor |
| 2006/0271844 A1 | 11/2006 | Suklikar |
| 2006/0277588 A1 | 12/2006 | Harrington et al. |
| 2007/0005446 A1 | 1/2007 | Fusz et al. |
| 2007/0016486 A1 | 1/2007 | Stone et al. |
| 2007/0027754 A1 | 2/2007 | Collins et al. |
| 2007/0033087 A1 | 2/2007 | Combs et al. |
| 2007/0033520 A1 | 2/2007 | Kimzey et al. |
| 2007/0053513 A1 | 3/2007 | Hoffberg |
| 2007/0100519 A1 | 5/2007 | Engel |
| 2007/0150368 A1 | 6/2007 | Arora et al. |
| 2007/0209011 A1 | 9/2007 | Padmanabhuni et al. |
| 2007/0226540 A1 | 9/2007 | Konieczny |
| 2007/0250229 A1 | 10/2007 | Wu |
| 2007/0250327 A1 | 10/2007 | Hedy |
| 2007/0250840 A1* | 10/2007 | Coker .................. G06F 9/54 719/320 |
| 2007/0271154 A1 | 11/2007 | Broudy et al. |
| 2007/0271330 A1 | 11/2007 | Mattox et al. |
| 2007/0271389 A1 | 11/2007 | Joshi et al. |
| 2007/0282711 A1 | 12/2007 | Ullman et al. |
| 2007/0282712 A1 | 12/2007 | Ullman et al. |
| 2007/0282713 A1 | 12/2007 | Ullman et al. |
| 2007/0288413 A1 | 12/2007 | Mizuno et al. |
| 2007/0294192 A1 | 12/2007 | Tellefsen |
| 2008/0010561 A1 | 1/2008 | Bay et al. |
| 2008/0015929 A1 | 1/2008 | Koeppel et al. |
| 2008/0027827 A1 | 1/2008 | Eglen et al. |
| 2008/0119983 A1 | 5/2008 | Inbarajan et al. |
| 2008/0172632 A1 | 7/2008 | Stambaugh |
| 2008/0189143 A1 | 8/2008 | Wurster |
| 2008/0195435 A1 | 8/2008 | Bentley et al. |
| 2008/0195932 A1 | 8/2008 | Oikawa et al. |
| 2008/0201163 A1 | 8/2008 | Barker et al. |
| 2008/0255925 A1 | 10/2008 | Vailaya et al. |
| 2009/0012887 A1 | 1/2009 | Taub et al. |
| 2009/0024918 A1 | 1/2009 | Silverbrook et al. |
| 2009/0043780 A1 | 2/2009 | Hentrich, Jr. et al. |
| 2009/0070435 A1 | 3/2009 | Abhyanker |
| 2009/0089134 A1 | 4/2009 | Uyeki |
| 2009/0106036 A1 | 4/2009 | Tamura et al. |
| 2009/0112687 A1 | 4/2009 | Blair et al. |
| 2009/0182232 A1 | 7/2009 | Zhang et al. |
| 2009/0187513 A1 | 7/2009 | Noy et al. |
| 2009/0187939 A1 | 7/2009 | Lajoie |
| 2009/0204454 A1 | 8/2009 | Lagudi |
| 2009/0222532 A1 | 9/2009 | Finlaw |
| 2009/0265607 A1 | 10/2009 | Raz et al. |
| 2009/0313035 A1 | 12/2009 | Esser et al. |
| 2010/0023393 A1 | 1/2010 | Costy et al. |
| 2010/0070343 A1 | 3/2010 | Taira et al. |
| 2010/0082778 A1 | 4/2010 | Muilenburg et al. |
| 2010/0082780 A1 | 4/2010 | Muilenburg et al. |
| 2010/0088158 A1 | 4/2010 | Pollack |
| 2010/0100259 A1 | 4/2010 | Geiter |
| 2010/0100506 A1 | 4/2010 | Marot |
| 2010/0235219 A1 | 9/2010 | Merrick et al. |
| 2010/0235231 A1 | 9/2010 | Jewer |
| 2010/0293030 A1 | 11/2010 | Wu |
| 2010/0312608 A1 | 12/2010 | Shan et al. |
| 2010/0318408 A1 | 12/2010 | Sankaran et al. |
| 2010/0324777 A1 | 12/2010 | Tominaga et al. |
| 2011/0010432 A1 | 1/2011 | Uyeki |
| 2011/0015989 A1 | 1/2011 | Tidwell et al. |
| 2011/0022525 A1 | 1/2011 | Swinson et al. |
| 2011/0082804 A1 | 4/2011 | Swinson et al. |
| 2011/0145064 A1 | 6/2011 | Anderson et al. |
| 2011/0161167 A1 | 6/2011 | Jallapuram |
| 2011/0191264 A1 | 8/2011 | Inghelbrecht et al. |
| 2011/0196762 A1 | 8/2011 | Dupont |
| 2011/0224864 A1 | 9/2011 | Gellatly et al. |
| 2011/0231055 A1 | 9/2011 | Knight et al. |
| 2011/0288937 A1 | 11/2011 | Manoogian, III |
| 2011/0307411 A1 | 12/2011 | Bolivar et al. |
| 2012/0066010 A1 | 3/2012 | Williams et al. |
| 2012/0089474 A1 | 4/2012 | Xiao et al. |
| 2012/0095804 A1 | 4/2012 | Calabrese et al. |
| 2012/0116868 A1 | 5/2012 | Chin et al. |
| 2012/0158211 A1 | 6/2012 | Chen et al. |
| 2012/0209714 A1 | 8/2012 | Douglas et al. |
| 2012/0221125 A1 | 8/2012 | Bell |
| 2012/0268294 A1 | 10/2012 | Michaelis et al. |
| 2012/0278886 A1 | 11/2012 | Luna |
| 2012/0284113 A1 | 11/2012 | Pollak |
| 2012/0316981 A1 | 12/2012 | Hoover et al. |
| 2013/0046432 A1 | 2/2013 | Edwards et al. |
| 2013/0080196 A1 | 3/2013 | Schroeder et al. |
| 2013/0080305 A1 | 3/2013 | Virag et al. |
| 2013/0151334 A1 | 6/2013 | Berkhin et al. |
| 2013/0204484 A1 | 8/2013 | Ricci |
| 2013/0325541 A1 | 12/2013 | Capriotti et al. |
| 2013/0332023 A1 | 12/2013 | Bertosa et al. |
| 2014/0026037 A1 | 1/2014 | Garb et al. |
| 2014/0052327 A1 | 2/2014 | Hosein et al. |
| 2014/0088866 A1 | 3/2014 | Knapp et al. |
| 2014/0094992 A1 | 4/2014 | Lambert et al. |
| 2014/0136278 A1 | 5/2014 | Carvalho |
| 2014/0229391 A1 | 8/2014 | East et al. |
| 2014/0244110 A1 | 8/2014 | Tharaldson et al. |
| 2014/0277906 A1 | 9/2014 | Lowrey et al. |
| 2014/0278805 A1 | 9/2014 | Thompson |
| 2014/0316825 A1 | 10/2014 | Van Dijk et al. |
| 2014/0324275 A1 | 10/2014 | Stanek et al. |
| 2014/0337163 A1 | 11/2014 | Whisnant |
| 2014/0379530 A1 | 12/2014 | Kim et al. |
| 2015/0057875 A1 | 2/2015 | McGinnis et al. |
| 2015/0066781 A1 | 3/2015 | Johnson et al. |
| 2015/0066933 A1 | 3/2015 | Kolodziej et al. |
| 2015/0100199 A1 | 4/2015 | Kurnik et al. |
| 2015/0142256 A1 | 5/2015 | Jones |
| 2015/0227894 A1 | 8/2015 | Mapes, Jr. et al. |
| 2015/0268059 A1 | 9/2015 | Borghesani et al. |
| 2015/0286979 A1 | 10/2015 | Ming et al. |
| 2016/0004516 A1 | 1/2016 | Ivanov et al. |
| 2016/0071054 A1 | 3/2016 | Kakarala et al. |
| 2016/0092944 A1 | 3/2016 | Taylor et al. |
| 2016/0132935 A1 | 5/2016 | Shen et al. |
| 2016/0140609 A1 | 5/2016 | Demir |
| 2016/0140620 A1 | 5/2016 | Pinkowish et al. |
| 2016/0140622 A1 | 5/2016 | Wang et al. |
| 2016/0148439 A1 | 5/2016 | Akselrod et al. |
| 2016/0180358 A1 | 6/2016 | Battista |
| 2016/0180378 A1 | 6/2016 | Toshida et al. |
| 2016/0180418 A1 | 6/2016 | Jaeger |
| 2016/0267503 A1 | 9/2016 | Zakai-Or et al. |
| 2016/0275533 A1 | 9/2016 | Smith et al. |
| 2016/0307174 A1 | 10/2016 | Marcelle et al. |
| 2016/0357599 A1 | 12/2016 | Glatfelter |
| 2017/0039785 A1 | 2/2017 | Richter et al. |
| 2017/0053460 A1 | 2/2017 | Hauser et al. |
| 2017/0064038 A1* | 3/2017 | Chen .................. G06F 16/951 |
| 2017/0124525 A1 | 5/2017 | Johnson et al. |
| 2017/0262894 A1 | 9/2017 | Kirti et al. |
| 2017/0293894 A1 | 10/2017 | Taliwal et al. |
| 2017/0308844 A1 | 10/2017 | Kelley |
| 2017/0308864 A1 | 10/2017 | Kelley |
| 2017/0308865 A1 | 10/2017 | Kelley |
| 2017/0316459 A1 | 11/2017 | Strauss et al. |
| 2017/0337573 A1 | 11/2017 | Toprak |
| 2017/0352054 A1 | 12/2017 | Ma et al. |
| 2018/0225710 A1 | 8/2018 | Kar et al. |
| 2018/0232749 A1 | 8/2018 | Moore, Jr. et al. |
| 2018/0285901 A1 | 10/2018 | Zackrone |
| 2018/0285925 A1 | 10/2018 | Zackrone |

(56) References Cited

U.S. PATENT DOCUMENTS

2019/0297162 A1    9/2019  Amar et al.
2019/0334884 A1*  10/2019  Ross ................... H04L 63/0442
2020/0038363 A1    2/2020  Kim

OTHER PUBLICATIONS

Bo Hu1, A Platform based Distributed Service Framework for Large-scale Cloud Ecosystem Development. (Year: 2015).*

Open Bank Project , https://www.openbankproject.com/, retrieved Nov. 23, 2020, 10 pages.

Standards for Technology in Auto , https://www.starstandard.org/, retrieved Nov. 23, 2020, 4 pages.

U.S. Appl. No. 10/665,899, et al., Non-Final Office Action ,dated Aug. 30, 2010 ,23 pages.

U.S. Appl. No. 10/665,899, et al., Final Office Action ,dated Feb. 24, 2010 ,22 pages.

U.S. Appl. No. 10/665,899, et al., Final Office Action ,dated Jul. 7, 2008 ,11 pages.

U.S. Appl. No. 10/665,899, et al., Final Office Action ,dated Mar. 8, 2011 ,21 pages.

U.S. Appl. No. 10/665,899, et al., Final Office Action ,dated May 11, 2009 ,14 pages.

U.S. Appl. No. 10/665,899, et al., Non-Final Office Action ,dated Nov. 13, 2008 ,11 pages.

U.S. Appl. No. 10/665,899, et al., Non-Final Office Action ,dated Sep. 14, 2009 ,14 pages.

U.S. Appl. No. 10/665,899, et al., Non-Final Office Action ,dated Sep. 17, 2007 ,11 pages.

Anonymous, "Software ready for prime time", Automotive News. Detroit, vol. 76, Issue 5996, Nov. 5, 2001, 28 pages.

U.S. Appl. No. 11/149,909, et al., Final Office Action ,dated Feb. 4, 2009 ,14 pages.

U.S. Appl. No. 11/149,909, et al., Non-Final Office Action ,dated May 13, 2008 ,14 pages.

U.S. Appl. No. 11/149,909, et al., Non-Final Office Action ,dated May 6, 2009 ,6 pages.

U.S. Appl. No. 11/149,909, et al., Notice of Allowance ,dated Sep. 16, 2009 ,7 pages.

U.S. Appl. No. 11/414,939, et al., Non-Final Office Action ,dated Jul. 19, 2010 ,7 pages.

U.S. Appl. No. 11/414,939, et al., Non-Final Office Action ,dated Mar. 9, 2010 ,11 pages.

U.S. Appl. No. 11/414,939, et al., Notice of Allowance ,dated Nov. 2, 2010.

U.S. Appl. No. 11/442,821, et al., Final Office Action ,dated Apr. 7, 2009 ,19 pages.

U.S. Appl. No. 11/442,821, et al., Notice of Allowance ,dated Jul. 30, 2012 ,6 pages.

U.S. Appl. No. 11/442,821, et al., Non-Final Office Action ,dated Jun. 1, 2011 ,23 pages.

U.S. Appl. No. 11/442,821, et al., Final Office Action ,dated May 21, 2010 ,28 pages.

U.S. Appl. No. 11/442,821, et al., Non-Final Office Action ,dated Nov. 12, 2009 ,19 pages.

U.S. Appl. No. 11/442,821, et al., Final Office Action ,dated Nov. 29, 2011 ,26 pages.

U.S. Appl. No. 11/442,821, et al., Non-Final Office Action ,dated Sep. 3, 2008 ,14 pages.

U.S. Appl. No. 11/446,011, et al., Notice of Allowance ,dated Aug. 9, 2011 ,10 pages.

U.S. Appl. No. 11/446,011, et al., Final Office Action ,dated Jun. 8, 2010 ,12 pages.

U.S. Appl. No. 11/446,011, et al., Non-Final Office Action ,dated Mar. 1, 2011 ,15 pages.

U.S. Appl. No. 11/446,011, et al., Non-Final Office Action ,dated Nov. 27, 2009 ,14 pages.

U.S. Appl. No. 12/243,861, Notice of Allowance, dated Sep. 6, 2011, 10 pages.

Interconnection, In Roget's II The New Thesaurus. Boston, MA: Houghton Mifflin .credoreference.com/entry/hmrogets/interconnection, 1 page, 2003 Retrieved.

U.S. Appl. No. 11/524,602, et al., Notice of Allowance ,dated Aug. 6, 2013 ,22 pages.

U.S. Appl. No. 11/524,602, et al., Non-Final Office Action ,dated Dec. 11, 2009 ,20 pages.

U.S. Appl. No. 11/524,602, et al., Final Office Action ,dated Jul. 27, 2010 ,13 pages.

U.S. Appl. No. 11/524,602, et al., Final Office Action ,dated Jun. 26, 2012 ,11 pages.

U.S. Appl. No. 11/524,602, et al., Non-Final Office Action ,dated Nov. 14, 2011 ,19 pages.

U.S. Appl. No. 11/525,009, et al., Non-Final Office Action ,dated Aug. 10, 2011 ,18 pages.

U.S. Appl. No. 11/525,009, et al., Final Office Action ,dated Aug. 3, 2010 ,16 pages.

U.S. Appl. No. 11/525,009, et al., Non-Final Office Action ,dated Dec. 16, 2009 ,20 pages.

U.S. Appl. No. 11/525,009, et al., Notice of Allowance ,dated Jul. 23, 2012 ,19 pages.

U.S. Appl. No. 12/243,852, et al., Restriction Requirement ,dated Dec. 7, 2010.

U.S. Appl. No. 12/243,852, et al., Notice of Allowance ,dated Feb. 27, 2013 ,6 pages.

U.S. Appl. No. 12/243,852, et al., Non-Final Office Action ,dated Jan. 16, 2013 ,5 pages.

U.S. Appl. No. 12/243,852, et al., Non-Final Office Action ,dated Mar. 17, 2011 ,8 pages.

U.S. Appl. No. 12/243,852, et al., Supplemental Notice of Allowability ,dated Mar. 19, 2013 ,3 pages.

U.S. Appl. No. 12/243,852, et al., Final Office Action ,dated Oct. 24, 2011 ,13 pages.

U.S. Appl. No. 12/243,855, et al., Notice of Allowance ,dated Nov. 22, 2010 ,10 pages.

U.S. Appl. No. 12/243,855, et al., Non-Final Office Action ,dated Oct. 14, 2010 ,6 pages.

U.S. Appl. No. 12/243,855, et al., Notice of Allowance ,dated Oct. 28, 2010 ,5 pages.

U.S. Appl. No. 12/243,861, et al., Final Office Action ,dated Jun. 22, 2011 ,5 pages.

U.S. Appl. No. 12/243,861, et al., Non-Final Office Action ,dated Nov. 8, 2010 ,8 pgs.

U.S. Appl. No. 14/208,042, et al., Notice of Allowance ,dated May 6, 2021 ,13 pages.

U.S. Appl. No. 15/478,042, et al., Final Office Action ,dated May 5, 2021 ,38 pages.

U.S. Appl. No. 15/478,048, et al., Non-Final Office Action ,dated Mar. 8, 2021 ,69 pages.

U.S. Appl. No. 16/041,552, et al., Final Office Action ,dated Apr. 27, 2021 ,23 pages.

Johns,Pamela et al.,"Competitive intelligence in service marketing, Marketing Intelligence & Planning", vol. 28, No. 5 ,2010 ,pp. 551-570.

http://web.archive.org/web/20010718130244/http://chromedata.com/maing2/about/index.asp, 1 pg.

http://web.archive.org/web/20050305055408/http://www.dealerclick.com/, 1 pg.

http://web.archive.org/web/20050528073821/http://www.kbb.com/, 1 pg.

http://web.archive.org/web/20050531000823/http://www.carfax.com/, 1 pg.

Internet Archive Dan Gillmor Sep. 1, 1996.

Internet Archive Wayback Machine, archive of LDAP Browser.com—FAQ. Archived Dec. 11, 2000. Available at <http://web.archive.org/web/200012110152/http://www.ldapbrowser.com/faq/faq.php3?sID=fe4ae66f023d86909f35e974f3a1ce>.

Internet Archive Wayback Machine, archive of LDAP Browser.com—Product Info. Archived Dec. 11, 2000. Available at <http://web.archive.org/web/200012110541/.ldapbrowser.com/prodinfo/prodinfo.php3?sID=fe4ae66f2fo23d86909f35e974f3a1ce>.

(56) References Cited

OTHER PUBLICATIONS

Internet Archive: Audio Archive, archive.org/audio/audio-searchresults. php?search=@start=0&limit=100&sort=ad, printed May 12, 2004, 12 pgs.
Internet Archive: Democracy Now, archive.org/audio/collection. php?collection=democracy_now, printed May 12, 2004, 2 pgs.
Java 2 Platform, Enterprise Edition (J2EE) Overview, printed Mar. 6, 2010, 3 pgs.
Java version history—Wikipedia, the free encyclopedia, printed Mar. 6, 2010, 9 pgs.
Permissions in the Java™ 2 SDK, printed Mar. 6, 2010, 45 pgs.
Trademark Application, Serial No. 76375405. 13 pages of advertising material and other application papers enclosed. Available from Trademark Document Retrieval system at.
Trademark Electronic Search System record for Serial No. 76375405, Word Mark "NITRA".
An Appointment with Destiny—The Time for Web-Enabled Scheduling has Arrived, Link Fall ,2007 ,2 pages.
How a Solution found a Problem of Scheduling Service Appointments, Automotive News ,2016 ,4 pages.
IBM Tivoli Access Manager Base Administration Guide, Version 5.1. International Business Machines Corporation. Entire book enclosed and cited. ,2003 ,402 pgs.
NetFormx Offers Advanced Network Discovery Software, PR Newswire. Retrieved from highbeam.com/doc/1G1-54102907. html>. ,Mar. 15, 1999
Openbay Announces First-of-its-Kind Connected Car Repair Service, openbay.com ,Mar. 31, 2015 ,14 pages.
Service Advisor, Automotive Dealership Institute ,2007 ,26 pages.
xTime.com Web Pages, ,Jan. 8, 2015 ,1 page.
XTimes Newsletter, vol. 7 ,2013 ,4 pages.
U.S. Appl. No. 10/350,795, et al., Non-Final Office Action ,dated Dec. 26, 2008 ,13 pages.
U.S. Appl. No. 10/350,795, et al., Non-Final Office Action ,dated Feb. 6, 2006 ,11 pages.
U.S. Appl. No. 10/350,795, et al., Non-Final Office Action ,dated Jul. 22, 2009 ,22 pages.
U.S. Appl. No. 10/350,795, et al., Final Office Action ,dated Jul. 6, 2011 ,26 pages.
U.S. Appl. No. 10/350,795, et al., Non-Final Office Action ,dated Jun. 29, 2006 ,11 pages.
U.S. Appl. No. 10/350,795, et al., Non-Final Office Action ,dated Mar. 12, 2007 ,10 pages.
U.S. Appl. No. 10/350,795, et al., Final Office Action ,dated Mar. 3, 2010 ,24 pages.
U.S. Appl. No. 10/350,795, et al., Non-Final Office Action ,dated May 29, 2008 ,10 pages.
U.S. Appl. No. 10/350,795, et al., Notice of Allowance ,dated May 7, 2012 ,15 pages.
U.S. Appl. No. 10/350,795, et al., Non-Final Office Action ,dated Nov. 1, 2010 ,19 pages.
U.S. Appl. No. 10/350,796, et al., Notice of Allowance ,dated Feb. 1, 2006 ,5 pages.
U.S. Appl. No. 10/350,796, et al., Non-Final Office Action ,dated May 19, 2005 ,7 pages.
U.S. Appl. No. 10/350,810, et al., Notice of Allowance ,dated Apr. 14, 2008 ,6 pages.
U.S. Appl. No. 10/350,810, et al., Non-Final Office Action ,dated Apr. 17, 2007 ,12 pages.
U.S. Appl. No. 10/350,810, et al., Final Office Action ,dated Apr. 5, 2005 ,12 pages.
U.S. Appl. No. 10/350,810, et al., Notice of Non-compliant Amendment ,dated Dec. 12, 2006.
U.S. Appl. No. 10/350,810, et al., Non-Final Office Action ,dated Dec. 9, 2005 ,14 pages.
U.S. Appl. No. 10/350,810, et al., Final Office Action ,dated May 18, 2006 ,15 pages.
U.S. Appl. No. 10/350,810, et al., Final Office Action ,dated Nov. 14, 2007 ,13 pages.
U.S. Appl. No. 10/350,810, et al., Non-Final Office Action ,dated Sep. 22, 2004 ,10 pages.
U.S. Appl. No. 10/351,465, et al., Non-Final Office Action ,dated Jul. 27, 2004 ,9 pages.
U.S. Appl. No. 10/351,465, et al., Final Office Action ,dated May 5, 2005 ,8 pages.
U.S. Appl. No. 10/351,465, et al., Notice of Allowance ,dated Sep. 21, 2005 ,4 pages.
U.S. Appl. No. 10/351,606, et al., Notice of Allowance ,dated Apr. 4, 2006 ,12 pages.
U.S. Appl. No. 10/351,606, et al., Non-final Office Action ,dated Dec. 19, 2005 ,7 pages.
U.S. Appl. No. 10/351,606, et al., Non-final Office Action ,dated May 17, 2004 ,5 pages.
U.S. Appl. No. 10/351,606, et al., Non-Final Office Action ,dated May 17, 2004 ,6 pages.
U.S. Appl. No. 13/025,019, et al., Non-Final Office Action ,dated Apr. 22, 2016 ,16 pages.
U.S. Appl. No. 13/025,019, et al., Non-Final Office Action ,dated Apr. 5, 2013 ,15 pages.
U.S. Appl. No. 13/025,019, et al., Final Office Action ,dated Aug. 28, 2015 ,25 pages.
U.S. Appl. No. 16/041,552, Non-Final Office Action, dated Sep. 17, 2020, 16 pages.
U.S. Appl. No. 13/025,019, et al., Final Office Action ,dated Jul. 13, 2018 ,11 pages.
U.S. Appl. No. 13/025,019, et al., Non-Final Office Action ,dated Oct. 6, 2017 ,17 pages.
U.S. Appl. No. 13/025,019, et al., Final Office Action ,dated Sep. 12, 2013 ,13 pages.
U.S. Appl. No. 13/025,019, et al., Non-Final Office Action ,dated Sep. 18, 2014 ,15 pages.
U.S. Appl. No. 13/025,019, et al., Notice of Allowance ,dated Sep. 26, 2019 ,9 pages.
Openbay.com web pages, Openbay.com, retrieved from archive.org on May 14, 2019, 2 pages.
Openbay.com Web Pages, Openbay.com, retrieved from archive. org, May 14, 2019, 11 pages.
Openbay.com Web Pages, Openbay.com, retrieved from archive.org May 14, 2019, 6 pages.
PubNub Staff, Streaming Vehicle Data in Realtime with Automatic (Pt 1), Pubnub.com, Aug. 17, 2015, 13 pages.
CNY Business Journal, Frank La Voila named Southern Tier Small-Business Person of 1999, Jun. 11, 1999, 2 pages.
Needham, Charlie, "Google Now Taking Appointments for Auto Repair Shops", Autoshopsolutions.com, Aug. 25, 2015, 6 pages.
U.S. Appl. No. 14/208,042, et al., Final Office Action ,dated Apr. 16, 2018.
U.S. Appl. No. 14/208,042, et al., Non-Final Office Action ,dated Aug. 21, 2020 ,13 pages.
U.S. Appl. No. 14/208,042, et al., Final Office Action ,dated Dec. 6, 2016 ,26 pages.
U.S. Appl. No. 14/208,042, et al., Final Office Action ,dated Jan. 11, 2019 ,16 pages.
U.S. Appl. No. 14/208,042, et al., Advisory Action ,dated Jul. 12, 2018.
U.S. Appl. No. 14/208,042, et al., Non-Final Office Action ,dated Jun. 30, 2016 ,23 pages.
U.S. Appl. No. 14/208,042, et al., Non-Final Office Action ,dated Sep. 20, 2017.
U.S. Appl. No. 14/208,042, et al., Non-Final Office Action ,dated Sep. 21, 2018.
U.S. Appl. No. 15/134,779, et al., Final Office Action ,dated Feb. 27, 2020 ,18 pages.
U.S. Appl. No. 15/134,779, et al., Non-Final Office Action ,dated Jan. 30, 2019 ,26 pages.
U.S. Appl. No. 15/134,779, et al., Advisory Action ,dated Jul. 29, 2019 ,6 pages.
U.S. Appl. No. 15/134,779, et al., Final Office Action ,dated May 17, 2019 ,25 pages.
U.S. Appl. No. 15/134,779, et al., Non-Final Office Action ,dated Nov. 19, 2019 ,27 pages.

(56) References Cited

OTHER PUBLICATIONS

U.S. Appl. No. 15/134,779, et al., Notice of Allowance ,dated Sep. 9, 2020 ,12 pages.
U.S. Appl. No. 15/134,793, et al., Non-Final Office Action ,dated Jan. 30, 2019 ,26 pages.
U.S. Appl. No. 15/134,793, et al., Advisory Action ,dated Jul. 29, 2019 ,6 pages.
U.S. Appl. No. 15/134,793, et al., Final Office Action ,dated Mar. 27, 2020 ,22 pages.
U.S. Appl. No. 15/134,793, et al., Final Office Action ,dated May 13, 2019 ,26 pages.
U.S. Appl. No. 15/134,793, et al., Non-Final Office Action ,dated Nov. 19, 2019 ,31 pages.
U.S. Appl. No. 15/134,793, et al., Notice of Allowance ,dated Nov. 2, 2020 ,13 pages.
U.S. Appl. No. 15/134,820, et al., Non-Final Office Action ,dated Feb. 23, 2018.
U.S. Appl. No. 15/134,820, et al., Notice of Allowance ,dated Jan. 28, 2019 ,7 pages.
U.S. Appl. No. 15/134,820, et al., Final Office Action ,dated Sep. 21, 2018.
U.S. Appl. No. 15/478,042, et al., Non-Final Office Action ,dated Aug. 4, 2020 ,42 pages.
U.S. Appl. No. 15/478,042, et al., Final Office Action ,dated Mar. 19, 2020 ,35 pages.
U.S. Appl. No. 15/478,042, et al., Non-Final Office Action ,dated Oct. 10, 2019 ,26 pages.
U.S. Appl. No. 15/478,048, et al., Final Office Action ,dated Apr. 9, 2020 ,42 pages.
U.S. Appl. No. 15/478,048, et al., Non-Final Office Action ,dated Sep. 30, 2019 ,30 pages.
U.S. Appl. No. 15/602,999, et al., Notice of Allowance ,dated Apr. 18, 2019 ,6 pages.
U.S. Appl. No. 15/602,999, et al., Advisory Action ,dated Jan. 31, 2019 ,3 pages.
U.S. Appl. No. 15/602,999, et al., Non-Final Office Action ,dated May 3, 2018.
U.S. Appl. No. 15/602,999, et al., Final Office Action ,dated Nov. 21, 2018.
U.S. Appl. No. 16/041,552, et al., Non-Final Office Action ,dated Dec. 27, 2019 ,13 pages.
U.S. Appl. No. 16/041,552, et al., Final Office Action ,dated May 29, 2020 ,18 pages.
Aloisio,Giovanni et al.,Web-based access to the Grid using the Grid Resource Broker portal, Google ,2002 , pp. 1145-1160.
Bedell,Doug et al., Dallas Morning News, "I Know Someone Who Knows Kevin Bacon". Oct. 27, 1998. 4 pgs.
Chadwick,D.W. et al., Understanding X.500—The Directory, Available at <http://sec.cs.kent.ac.uk/x500book/>. Entire work cited. ,1996.
Chatterjee,Pallab et al.,On-board diagnostics not just for racing anymore, EDN.com ,May 6, 2013 ,7 pages.
Chen,Deren et al., Business to Business Standard and Supply Chain System Framework in Virtual Enterprises, Computer Supported Cooperative Work in Design, The Sixth International Conference on 2001 ,pp. 472-476.
Croswell,Wayne et al., Service Shop Optimiztion, Modern Tire Retailer ,May 21, 2013 ,7 pages.
Davis,Peter T. et al., Sams Teach Yourself Microsoft Windows NT Server 4 in 21 Days, Sams® Publishing, ISBN: 0-672-31555-6 ,1999, printed Dec. 21, 2008 ,15 pages.
Derfler,Frank J. et al., How Networks Work: Millennium Edition, Que, A Division of Macmillan Computer Publishing, ISBN: 0-7897-2445-6 ,2000 ,9 pages.
Drawbaugh,Ben et al.,Automatic Link Review: an expensive way to learn better driving habits, Endgadget.com , Nov. 26, 2013 ,14 pages.
Emmanuel,Daniel et al.,Basics to Creating an Appointment System for Automotive Service Customers, Automotiveservicemanagement.com ,2006 ,9 pages.
Hogue, et al.,Thresher: Automating the Unwrapping of Semantic Content from the World Wide Web, ACM ,2005 , pp. 86-95.
Housel,Barron C. et al.,WebExpress: A client/intercept based system for optimizing Web browsing in a wireless environment, Google ,1998 ,pp. 419-431.
Jenkins,Will et al.,Real-time vehicle performance monitoring with data intergrity, A Thesis Submitted to the Faculty of Mississippi State University ,Oct. 2006 ,57 pages.
Lavrinc,Damon et al.,First Android-powered infotainment system coming to 2012 Saab 9-3, Autoblog.com ,Mar. 2, 2011 ,8 pages.
Lee,Adam J. et al.,Searching for Open Windows and Unlocked Doors: Port Scanning in Large-Scale Commodity Clusters, Cluster Computing and the Grid, 2005. IEEE International Symposium on vol. 1 ,2005 ,pp. 146-151.
Michener,J.R. et al.,Managing System and Active-Content Integrity, Computer; vol. 33, Issue: 7 ,2000 ,pp. 108-110.
Milic-Frayling,Natasa et al.,SmartView: Enhanced Document Viewer for Mobile Devices, Google ,Nov. 15, 2002 ,11 pages.
Phelan,Mark et al.,Smart phone app aims to automate car repairs, Detroit Free Press Auto Critic ,Mar. 31, 2015 ,2 pages.
Strebe,Matthew et al., MCSE: NT Server 4 Study Guide, Third Edition. SYBEX Inc. Front matter ,2000 ,pp. 284-293, and 308-347.
Warren,Tamara et al.,This Device Determines What Ails Your Car and Finds a Repair Shop—Automatically, CarAndDriver.com ,Apr. 8, 2015 ,7 pages.
You,Song et al.,Overview of Remote Diagnosis and Maintenance for Automotive Systems, 2005 SAE World Congress ,Apr. 11-14, 2015 ,10 pages.

* cited by examiner

SYSTEMS, METHODS, AND APPARATUSES FOR ROUTING API CALLS

TECHNICAL FIELD

The present disclosure relates generally to handling API calls. More specifically, the present disclosure relates to methods, systems and apparatuses for routing API calls to multiple backend systems that share a common API.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Described herein are embodiments of systems, apparatuses, and methods for routing Application Programming Interface (API) calls using a common API to multiple backend systems. An API gateway is a way to connect various developers or applications to a backend system. Traditional API gateways use an API to connect a client competing device to services of a single backend system. Unlike traditional API gateways, the embodiments herein include smart routing API gateways that can reuse a single API for to connect multiple different applications and clients to multiple different backend systems.

Using a common API to connect multiple applications to multiple backend systems can lead to greater computing efficiencies. For instance, the traditional API gateway can receive API calls from many client computing devices and routes them to a single backend system. However, this means that for each backend system, the developer would have to develop multiple integrations of an API if it was desired to use the API with multiple backend systems. In contrast, the smart routing API gateway is capable of connecting many client computing devices and applications to many backend systems. This allows a developer to develop a single API that can be used to access multiple backend systems. Thus, with a smart routing API gateway fewer application integrations would need to be developed.

In some embodiments herein, an API gateway may receive an API call comprising a unique identifier. The API gateway may identify the unique identifier in the API call and determine a target backend system associated with the unique identifier from a plurality of backend systems. The API gateway may then route the API call to the target backend system based on the unique identifier.

The phrases "coupled to," "connected to," and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

It will be readily understood that the components of the embodiments as generally described below and illustrated in the Figures herein could be arranged and designed in a wide variety of different configurations. For instance, the steps of a method do not necessarily need to be executed in any specific order, or even sequentially, nor do the steps need to be executed only once. Thus, the following more detailed description of various embodiments, as described below and represented in the Figures, is not intended to limit the scope of the disclosure but is merely representative of various embodiments. While the various aspects of the embodiments are presented in the drawings, the drawings are not necessarily drawn to scale unless specifically indicated.

Embodiments and implementations of systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Embodiments may be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables; telephone lines; radio waves; satellites; microwave relays; modulated AC power lines; physical media transfer; and/or other data transmission "wires" known to those of skill in the art. The network may encompass smaller networks and/or be connectable to other networks through a gateway or similar mechanism.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as JavaScript, Modern Fortran, Java, Pascal, C++, C, PHP, .Net, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Aspects of certain embodiments may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system (DBMS) allows users to interact with one or more databases and provides access to the data contained in the databases.

Figure 1:
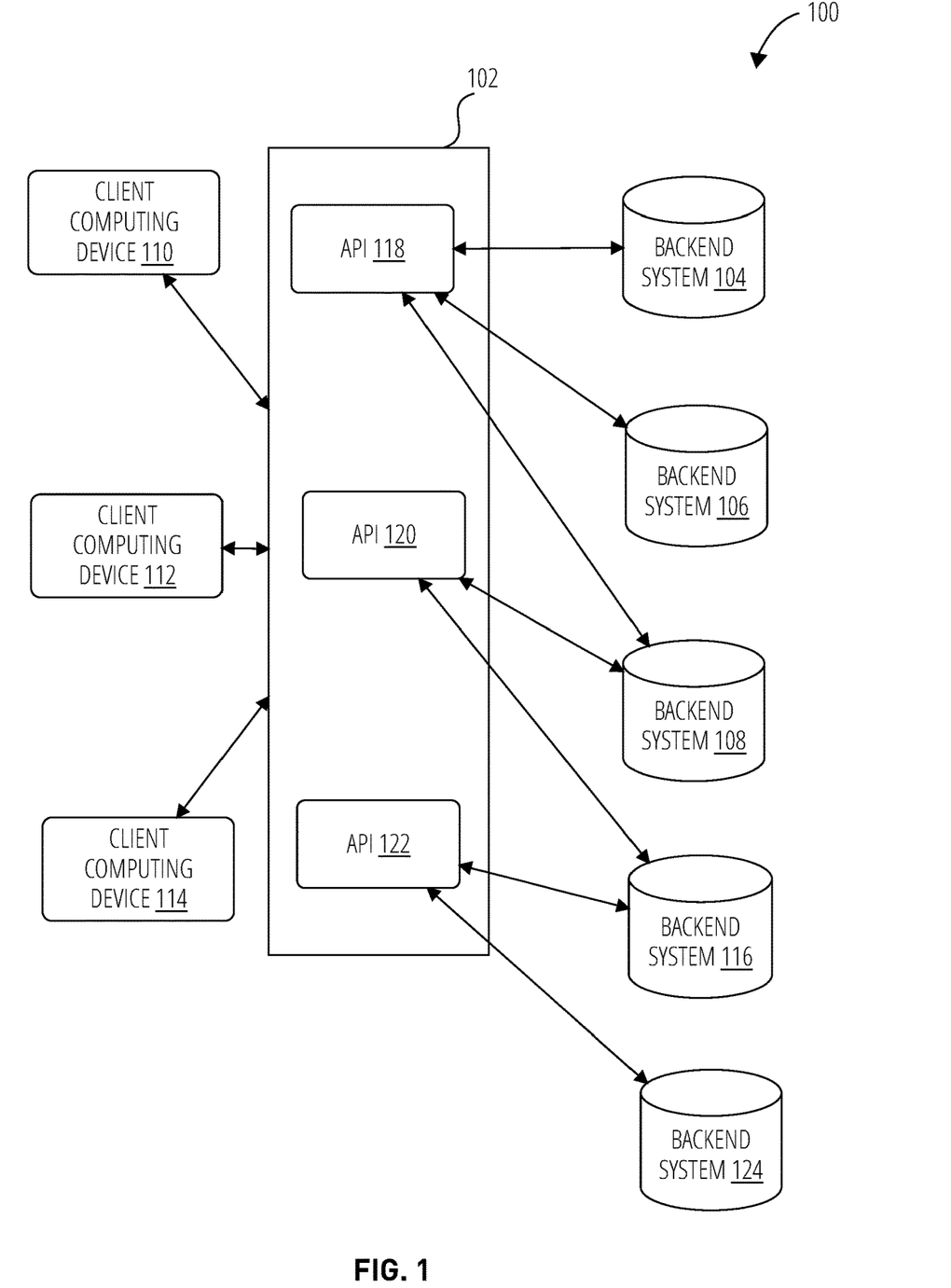
FIG. 1 illustrates a block diagram of an API call routing system 100 in accordance with one embodiment.

FIG. 1 illustrates a block diagram of an API call routing system 100 in accordance with one embodiment. As shown, the API call routing system 100 may include a plurality of client computing devices (e.g., first client computing device 110, second client computing device 112, and third client computing device 114), an API gateway 102, and a plurality of backend systems (e.g., first backend system 104, second backend system 106, third backend system 108 fourth backend system 116, and fifth backend system 124).

The client computing devices may be configured for a variety of clients. For example, the client computing devices may be used for a plurality of different car dealerships. Each client may use one or more applications for their business. Therefore, each client computing device may have one or more applications. The applications may include applications related to finances, inventory management, contact management, and scheduling management. The client computing devices may communicate with the API gateway 102. For example, the client computing devices may make API calls to the API gateway 102 and receive payloads associated with the calls.

The API calls may be a request by an application on a client computing device for information from one of the backend systems. The backend systems may store information and provide one or more services. The backend systems may be separately maintained systems that do not communicate directly with one another. In some embodiments, the backend systems may be managed by different companies. The backend systems may be controlled by one or more data providers. For example, the backend systems may be car dealer management system, a statistic provider, an insurance company, etc.

As shown, the API gateway 102 may route API calls from the client computing devices to the appropriate backend system using one of the APIs (e.g., first API 118, second API 120, and third API 122). As shown, some APIs may be capable of communicating with multiple databases. Thus, an API call from a client computing device may correspond to an API that is common to multiple backend systems.

Accordingly, when the API gateway 102 receives an API call, the associated API may determine the proper backend system to route the call too. In some embodiments, the API call routing system 100 may use unique identifiers in the API call to indicate which backend system to use. The unique identifiers may be subscription identifiers that are unique to an application, a client, or a combination of the application for a client. In some embodiments, the unique identifiers may be part of the API header. In some embodiments, the unique identifiers may be part of the API payload. In some embodiments, the unique identifiers may be a universally unique identifier (UUID) or a globally unique identifier (GUID). The unique identifiers may be 24 bytes or 36 bytes.

Figure 2:
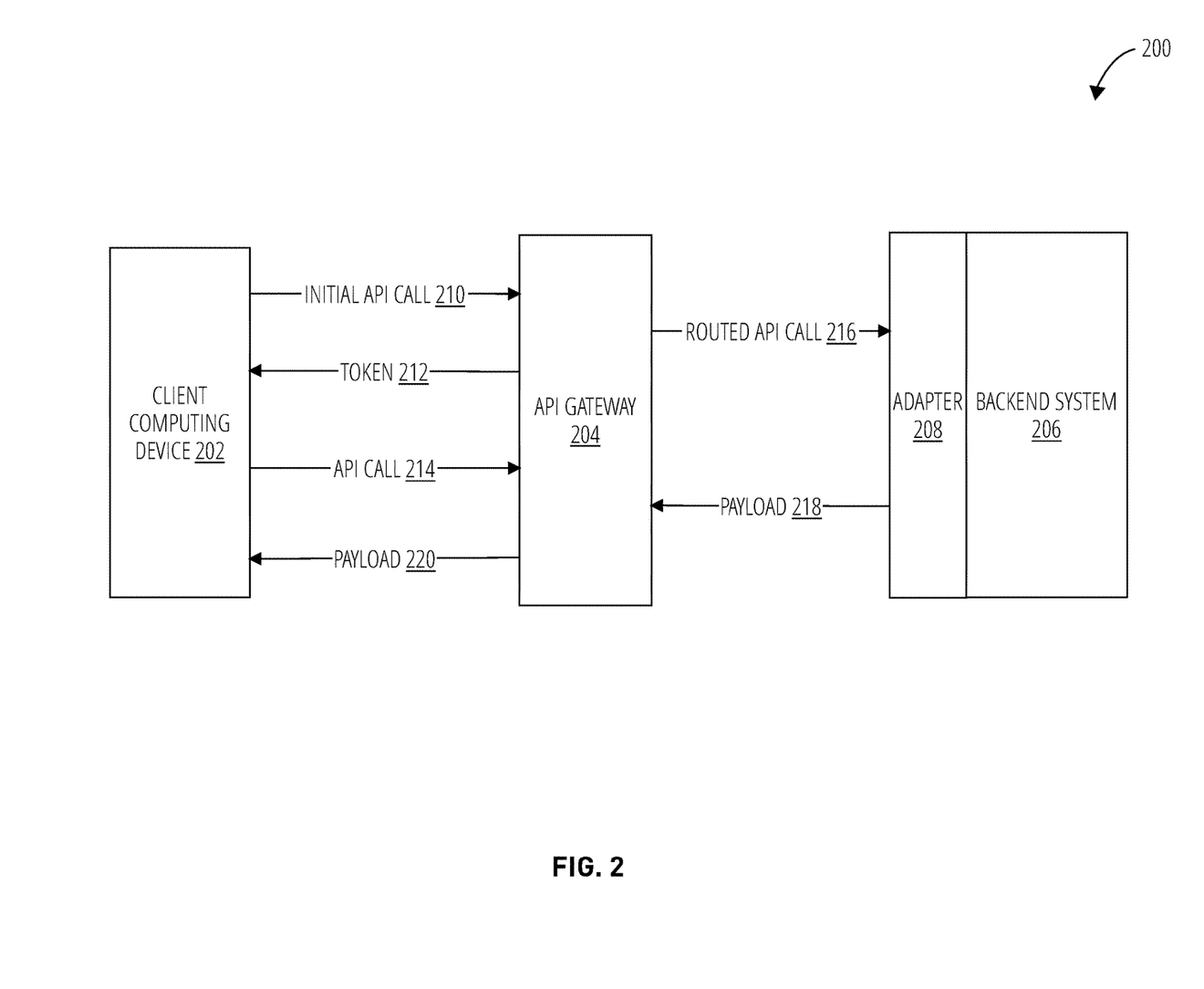
FIG. 2 illustrates a simplified signal flow diagram 200 for a smart routing API gateway 204 in accordance with one embodiment.

FIG. 2 illustrates a simplified signal flow diagram 200 for a smart routing API gateway 204 in accordance with one embodiment. As shown, the API gateway 204 may use token-based security to prevent unauthorized access to the multiple backend systems in communication with the API gateway 204. For example, the API gateway 204 may use OAUTH security.

The client computing device 202 may send an initial API call 210 to the API gateway 204. The initial API call 210 may be sent when a client is setting up an application. The initial API call 210 may initiate interaction between the client computing device 202 and the API gateway 204 and be used to receive a token 212. The token may be used to provide authorization of future API calls. For example, the token may be issued to determine what application and client has authority to access a data source (e.g., backend system 206).

The client computing device 202 may send an API call 214 to the API gateway 204. The API call 214 may include a unique identifier such as a subscription identifier for the client and application. The client computing device 202 may also send the token with the API call 214. The API gateway 204 may check that the token is still authorized for the application and client that sent the API call 214. If the API call 214 is authorized to proceed, the API gateway 204 may determine the unique identifier in the API call 214 and determine which backend system to route the API call 214.

In the illustrated embodiment, the API gateway 204 determines that the unique identifier is associated with the backend system 206. Accordingly, the API gateway 204 sends a routed API call 216 to the backend system 206. An adapter 208 formats the routed API call 216 for the backend system 206. The backend system 206 responds to the routed API call 216 by sending a payload 218 to the API gateway 204. The API gateway 204 may forward the payload 220 to the client computing device 202.

Figure 3:
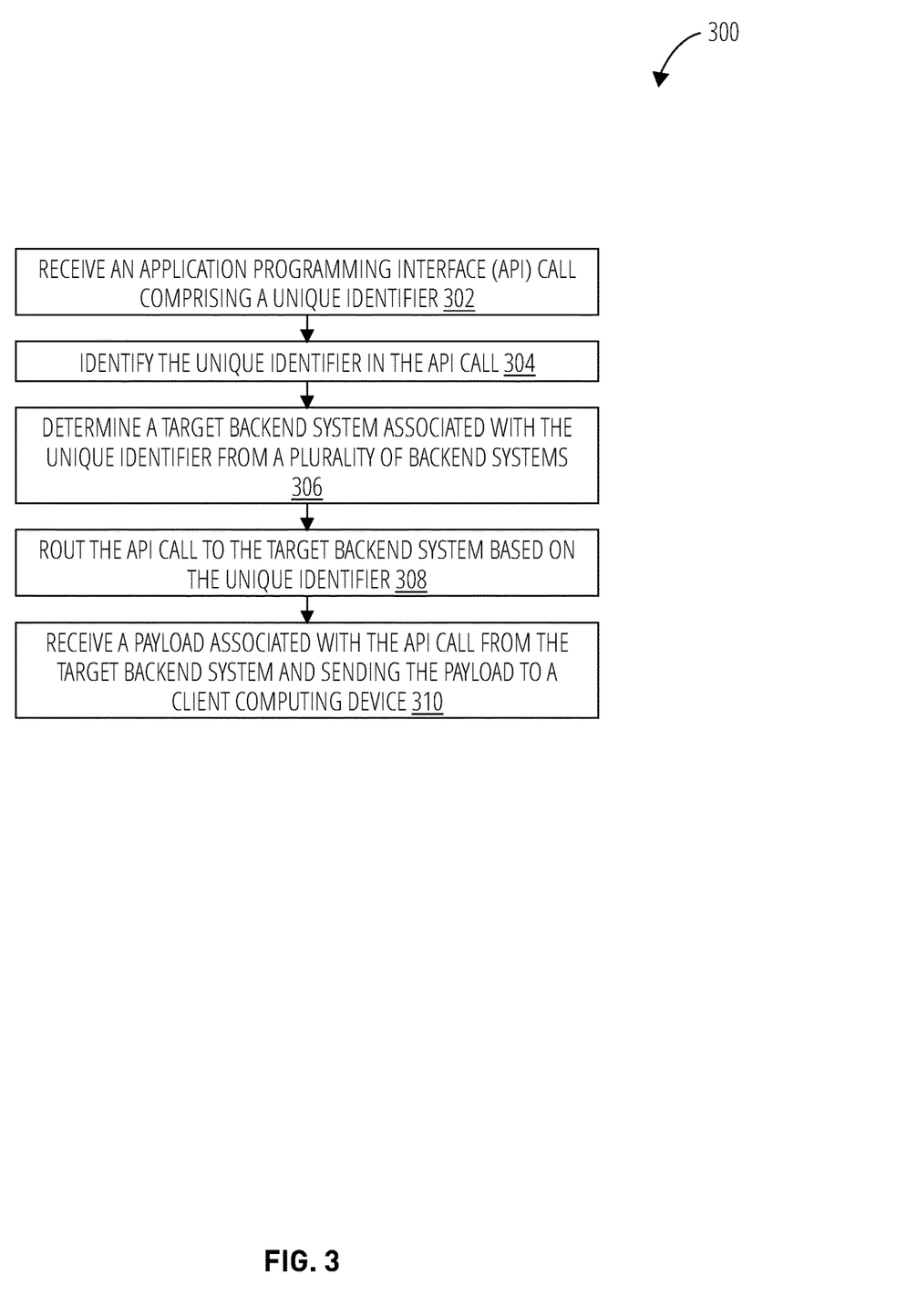
FIG. 3 illustrates a method 300 to route an API call in accordance with one embodiment.

FIG. 3 illustrates a method 300 to route an API call in accordance with one embodiment. A system implementing the method 300 may receive 302 an API call comprising a unique identifier. The system may identify 304 the unique identifier in the API call. The unique identifier may be a subscription identifier unique to an application and a client. In some embodiments, the unique identifier may be in the header of the API call. In some embodiments, the unique identifier may be in the payload of the API call.

The system may determine 306 a target backend system associated with the unique identifier from a plurality of backend systems. The API call may correspond to an API that is common to multiple backend systems communicatively coupled with the router. Accordingly, the system may determine how to route the API call based on the unique identifier.

The system may route 308 the API call to the target backend system based on the unique identifier. The target backend system may be one of a dealer management system, a statistic provider, or an insurance company. In some embodiments, the backend systems that are associated with the API may be from different data providers. The system may receive 310 a payload associated with the API call from the target backend system and send the payload to a client computing device. In some embodiments, the system may receive a token with the API call and check that the token is valid for the unique identifier of the API call.

Figure 4:
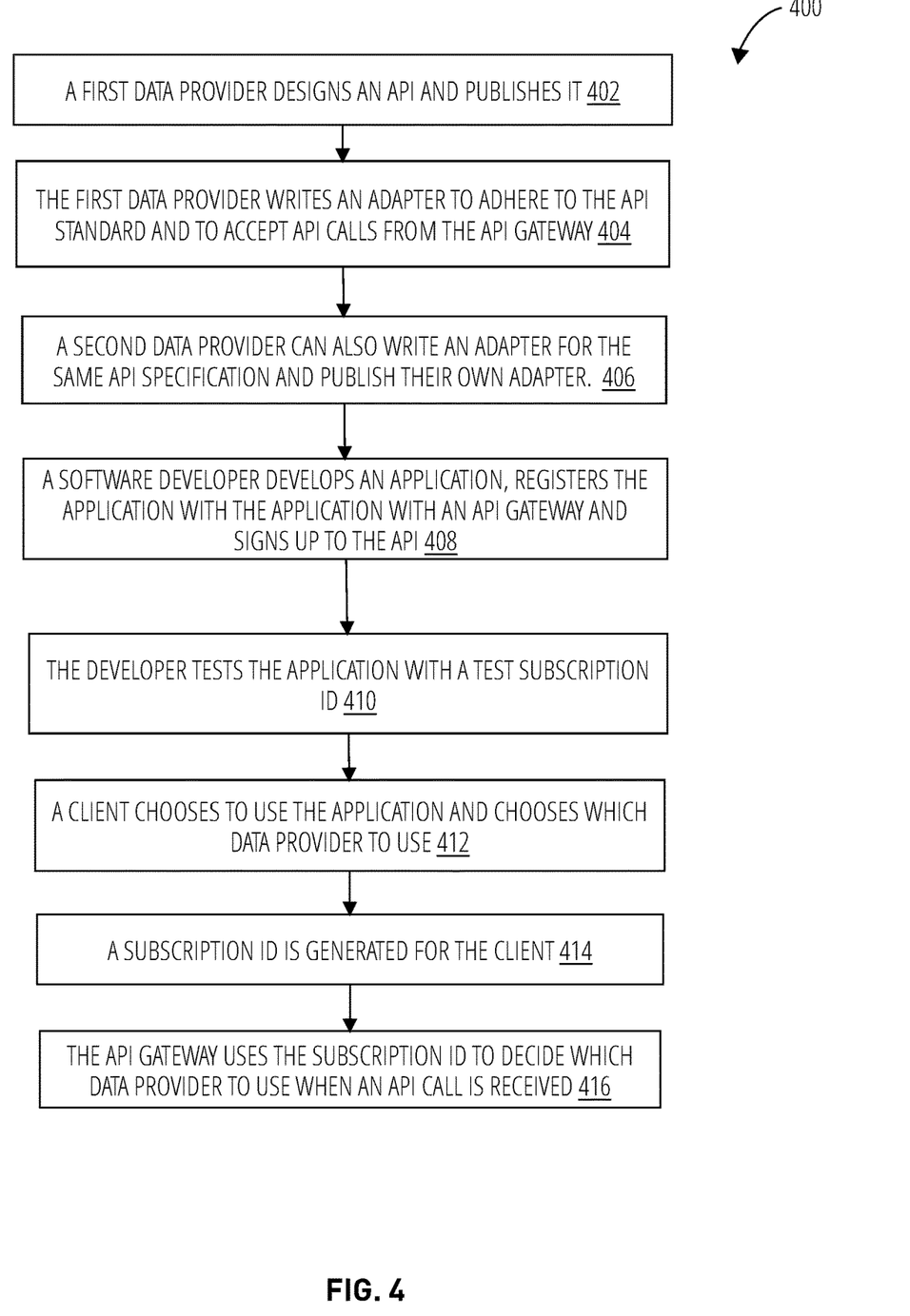
FIG. 4 illustrates a method 400 to create and implement an API common to multiple backend systems in accordance with one embodiment.

FIG. 4 illustrates a method 400 to create and implement an API common to multiple backend systems in accordance with one embodiment. In the method 400, a first data provider designs 402 an API and publishes it. The data provider may be an automobile dealer management system, statistic provider, or an insurance company.

This API may be used by other data providers for their backend systems. For example, a second data provider can also write 406 an adapter for the same API specification and publish their own adapter. Using a common API for multiple data providers or multiple backend systems allows for fewer APIs which may assist the data providers and software developers as there are fewer APIs needed to be developed and applications will not have to be written for multiple APIs. Additionally, this may provide a client with a choice of providers for the data.

In the method 400, a software developer develops 408 an application, registers the application with the application with an API gateway, and signs up to the API. The software developer may test 410 the application with a test subscription ID. A client may choose 412 to use the application and choose which data provider to use 412.

A subscription ID may be generated 414 for the client for the application. The API gateway may use 416 the subscription ID to decide which data provider to use when an API call is received. Thus, the API gateway serves as a smart router to route API calls to a correct backend system and data provider. This means that multiple data providers can be accessed by the application without the software developer writing another specific integration of the application.

Figure 5:
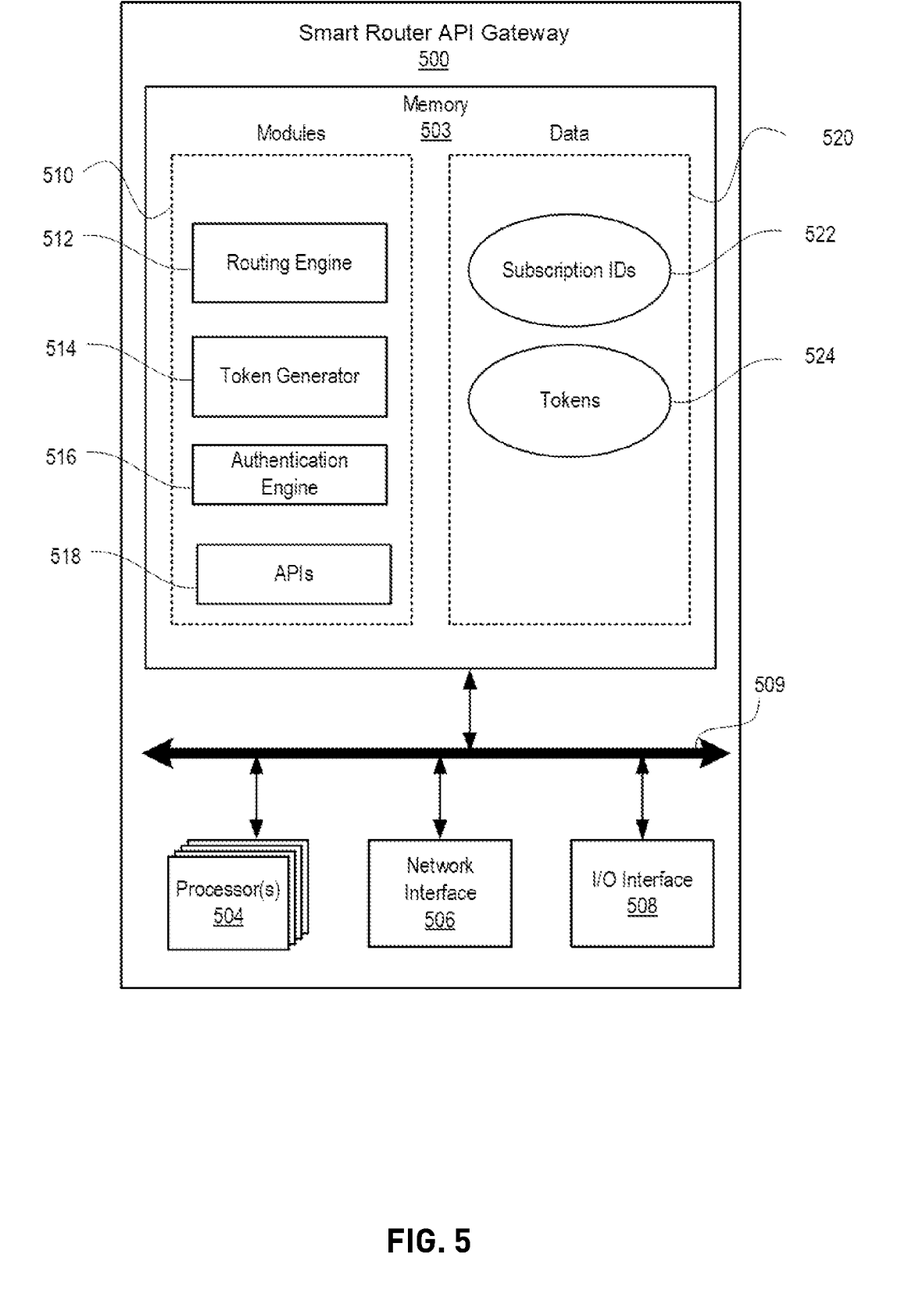
FIG. 5 is a block diagram of a smart router API gateway smart router API gateway 500 according to one embodiment.

FIG. 5 is a block diagram of a smart router API gateway smart router API gateway 500 according to one embodiment. The smart router API gateway 500 may perform the methods and use the techniques described with reference to the other figures in the specification. The smart router API gateway 500 can include a memory 503, one or more processors 504, a network interface 506, an input/output interface 508, and a system bus 509.

The one or more processors 504 may include one or more general purpose devices, such as an Intel®, AMD®, or other standard microprocessor. The one or more processors 504 may include a special purpose processing device, such as ASIC, SoC, SiP, FPGA, PAL, PLA, FPLA, PLD, or other customized or programmable device. The one or more processors 504 can perform distributed (e.g., parallel) processing to execute or otherwise implement functionalities of the presently disclosed embodiments. The one or more processors 504 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 503 may include static RAM, dynamic RAM, flash memory, one or more flip-flops, ROM, CD-ROM, DVD, disk, tape, or magnetic, optical, or other computer storage medium. The memory 503 may include a plurality of program modules 510 and program data 520. The memory 503 may be local to the smart router API gateway 500, as shown, or may be distributed and/or remote relative to the smart router API gateway 500.

Data generated or used by the smart router API gateway 500, such as by the program modules 510 or other modules, may be stored on the memory 503, for example, as stored program data 520. The data 520 may be organized as one or more databases.

The data 520 may include subscription IDs 522 and tokens 524. The subscription IDs 522 may be unique identifiers for an application, a client, or a combination of the application and client. The subscription ID may be assigned per application and client during a setup process of the application. The smart router API gateway 500 may associate the subscription ID with a backend system that the client indicated. The smart router API gateway 500 may route API calls to the indicated backend system. The tokens 524 may be used to authorize access to backend systems for applications and clients.

The program modules 510 may run multiple operations concurrently or in parallel by or on the one or more processors 504. In some embodiments, portions of the disclosed modules, components, and/or facilities are embodied as executable instructions embodied in hardware or firmware, or stored on a non-transitory, machine-readable storage medium. The executable instructions may comprise computer program code that, when executed by a processor and/or computing device, cause a computing system to implement certain processing steps, procedures, and/or operations, as disclosed herein. The modules, components, and/or facilities disclosed herein may be implemented and/ or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/ or the like. Accordingly, the modules disclosed herein may be referred to as controllers, layers, services, engines, facilities, drivers, circuits, subsystems, and/or the like.

The modules 510 may comprise a routing engine 512, a token generator 514, an authentication engine 516, and one or more APIs 518. The routing engine 512 may be used to route API calls to a correct backend system based on the subscription ID within the API call. The token generator 514 and authentication engine 516 may be used to determine authorization of the API calls before accessing a backend system. The one or more APIs may be developed by data providers to access backend systems. An API may be common to multiple data providers and/or backend systems.

The input/output interface 508 may facilitate user interaction with one or more input devices and/or one or more output devices. The input device(s) may include a keyboard, mouse, touchscreen, light pen, tablet, microphone, sensor, or other hardware with accompanying firmware and/or software. The output device(s) may include a monitor or other display, printer, speech or text synthesizer, switch, signal line, or other hardware with accompanying firmware and/or software. For example, in one embodiment, the input/output interface 508 comprises a display to provide a graphical user interface (GUI) illustrating the potential ablation perimeters. The input/output interface 508 can receive the user input data 522. In some embodiments, the input/output interface 508 is a touchscreen, and the size input is received via the touchscreen. In some embodiments, the input/output interface 508 can superimpose the target ablation perimeters on an image of the tissue.

The network interface 506 may facilitate communication with other computing devices and/or networks and/or other computing and/or communications networks. The network interface 506 may be equipped with conventional network connectivity, such as, for example, Ethernet (IEEE 1102.3), Token Ring (IEEE 1102.5), Fiber Distributed Datalink Interface (FDDI), or Asynchronous Transfer Mode (ATM). Further, the network interface 506 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 509 may facilitate communication and/or interaction between the other components of the smart router API gateway 500, including the one or more processors 504, the memory 503, the input/output interface 508, and the network interface 506.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

While specific embodiments of stents have been illustrated and described, it is to be understood that the disclosure provided is not limited to the precise configuration and components disclosed. Various modifications, changes, and variations apparent to those of skill in the art having the benefit of this disclosure may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill, having the benefit of this disclosure, in the art that changes may be made to the details of the above-described embodiments without departing from the underlying principles of the disclosure herein.

What is claimed is:

1. A method to route an API call, the method comprising: connecting a plurality of clients to a plurality of backend systems via an Application Programming Interface (API) gateway comprising a common API that is used by multiple of the plurality of backend systems, wherein connecting comprises: registering an application on one of the plurality of clients with the common API on the API gateway; receiving an indication of a target backend system that the application is to access using the common API, wherein the target backend system is one of the plurality of backend systems using the common API; assigning a unique identifier to the application; and associating the unique identifier with the target backend system; receiving, at the common API gateway, an API call comprising a unique identifier from the assigned unique identifiers; identifying the unique identifier in the API call; determining, via the common API, the target backend system associated with the unique identifier from the plurality of backend systems; and routing, via the common API, the API call to the target backend system based on the unique identifier;

wherein the unique identifier is within a header of the API call, receiving a token with the API call and checking that the token is valid for the unique identifier of the API call.

2. The method of claim 1, wherein the API call corresponds to the common API that is common to multiple backend systems communicatively coupled with the API gateway.

3. The method of claim 1,wherein the unique identifier is a subscription identifier unique to an application and a client.

4. The method of claim 1, wherein the target backend system is implemented by one of a plurality of data providers using the common API.

5. The method of claim 1, further comprising receiving a payload associated with the API call from the target backend system and sending the payload to a client computing device.

6. An API gateway comprising: an interface to communicate with a plurality of client computing devices comprising one or more applications and a plurality of backend systems; memory to store one or more APIs and one or more processors configured to: register each of the one or more applications with a corresponding API of the one or more APIs, wherein at least one of the one or more APIs is common to multiple backend systems; receive an indication of a target backend system for applications registered with an API common to multiple backend systems; assign unique identifiers to each application of the one or more applications on the plurality of client computing devices; associate each of the unique identifiers with one of the plurality of backend systems; receive an API call comprising a unique identifier from a client computing device; identify the unique identifier in the API call determine, via an API associated with the API call, the target backend system associated with the unique identifier from the plurality of backend systems; and route, via the API associated with the API call, the API call to the target backend system based on the unique identifier;
 wherein the unique identifier is within a header of the API call,
 comprising receiving a token with the API call and checking that the token is valid for the unique identifier of the API call.

7. The API gateway of claim 6, wherein the API call corresponds to an API that is common to multiple backend systems communicatively coupled with the API gateway.

8. The API gateway of claim 6, wherein the unique identifier is a subscription identifier unique to an application and a client.

9. The API gateway of claim 6, wherein the target backend system is implemented by one of a plurality of data providers using a common API.

10. The API gateway of claim 6, wherein the one or more processors are further configured to receive a payload associated with the API call from the target backend system and send the payload to a client computing device.

11. An API call router comprising: memory to store an API associated with more than one backend system; one or more processors configured to: register an application on one of a plurality of clients with a common API that is used by multiple backend systems, receive an indication of a target backend system that the application is to access using the common API, wherein the target backend system is one of the multiple backend systems using the common API; assign a unique identifer to the application; associate the unique identifer with the target backend system; receive an API call corresponding to the API, the API call comprising a unique identifier from a client computing device; identify the unique identifier in the API call determine, via the common API, the target backend system associated with the unique identifier from the more than one backend systems associated with the API; and route, via the common API, the API call to the target backend system based on the unique identifer;
 wherein the unique identifier is within a header of the API call;
 wherein the one or more processors are further configured to receive a token with the API call and check that the token is valid for an application making the API call based on the unique identifier.

12. The API call router of claim 11, wherein the unique identifer is a subscription identifier unique to an application and a client.

13. The API call router of claim 11, wherein the target backend system is implemented by one of a plurality of data providers using the API.

14. The API call router of claim 11, wherein the one or more processors are further configured to receive a payload associated with the API call from the target backend system and send the payload to a client computing device.

* * * * *